US010972978B2

(12) United States Patent
Li et al.

(10) Patent No.: US 10,972,978 B2
(45) Date of Patent: Apr. 6, 2021

(54) ELECTRONIC TAG SYSTEM AND METHOD OF UPDATING ELECTRONIC TAG INFORMATION

(71) Applicant: BOE TECHNOLOGY GROUP CO., LTD., Beijing (CN)

(72) Inventors: Tao Li, Beijing (CN); Jingyu Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/622,845

(22) PCT Filed: Mar. 22, 2019

(86) PCT No.: PCT/CN2019/079167
§ 371 (c)(1),
(2) Date: Dec. 13, 2019

(87) PCT Pub. No.: WO2019/179508
PCT Pub. Date: Sep. 26, 2019

(65) Prior Publication Data
US 2020/0205077 A1 Jun. 25, 2020

(30) Foreign Application Priority Data
Mar. 22, 2018 (CN) .......................... 201810240846.0

(51) Int. Cl.
*H04W 52/02* (2009.01)
*H04W 4/48* (2018.01)
(Continued)

(52) U.S. Cl.
CPC ........ *H04W 52/0229* (2013.01); *G02F 1/167* (2013.01); *G02F 1/1675* (2019.01);
(Continued)

(58) Field of Classification Search
CPC ......... B60R 13/10; G08G 1/017; H04W 4/48; G09F 3/208
See application file for complete search history.

(56) References Cited

U.S. PATENT DOCUMENTS 6,850,209 B2 * 2/2005 Mankins .............. B60Q 1/2611
340/469
2008/0201215 A1 * 8/2008 Lin ..................... G06Q 30/0267
705/14.62

FOREIGN PATENT DOCUMENTS

CN 101770687 A 7/2010
CN 102254435 B 1/2013
(Continued)

OTHER PUBLICATIONS

International Search Report and Written Opinion dated Jun. 20, 2019, received for corresponding Chinese PCT Application No. PCT/CN2019/079167, 18 pages.

*Primary Examiner* — Hongmin Fan
(74) *Attorney, Agent, or Firm* — Kinney & Lange, P.A.

(57) ABSTRACT

An electronic tag system and a method of updating electronic tag information are provided. The electronic tag system includes: a communication device, configured to receive updated annual inspection information; a display device, configured to display the updated annual inspection information; and a power control device, connected to the communication device and the display device respectively and configured to: connect, when the communication device receives the updated annual inspection information, a power source to the display device electrically to power the display device, so as to perform updating of annual inspection information on the display device; and disconnect the power source from the display device when the updating is over.

16 Claims, 3 Drawing Sheets

(51) Int. Cl.
   *G02F 1/1675* (2019.01)
   *G02F 1/167* (2019.01)
   *G09F 3/20* (2006.01)
   *G09F 9/37* (2006.01)
   *G09G 3/34* (2006.01)
   *G09F 21/04* (2006.01)

(52) U.S. Cl.
   CPC .............. *G09F 3/208* (2013.01); *G09F 9/372* (2013.01); *G09G 3/344* (2013.01); *H04W 4/48* (2018.02); *G09F 3/203* (2013.01); *G09F 21/04* (2013.01)

(56) References Cited

FOREIGN PATENT DOCUMENTS

| | | |
|---|---|---|
| CN | 102982367 A | 3/2013 |
| CN | 105005800 A | 10/2015 |
| CN | 105005811 A | 10/2015 |
| CN | 204904314 U | 12/2015 |
| CN | 106096684 A | 11/2016 |
| CN | 108398841 A | 8/2018 |
| CN | 208752364 U | 4/2019 |
| WO | 2017158557 A1 | 9/2017 |

\* cited by examiner

ELECTRONIC TAG SYSTEM AND METHOD OF UPDATING ELECTRONIC TAG INFORMATION

CROSS-REFERENCE TO RELATED APPLICATION

The present application is the U.S. national phase of PCT Application No. PCT/CN2019/079167 filed on Mar. 22, 2019, which claims a priority to the Chinese patent application No. 201810240846.0 filed in China on Mar. 22, 2018, the disclosures of which are incorporated in their entirety by reference herein.

TECHNICAL FIELD

The present disclosure relates to the field of vehicle-mounted electronic tag, in particular to an electronic tag system and a method of updating electronic tag information.

BACKGROUND

A vehicle needs to undergo annual inspection, and an annual inspection sticker is attached on the vehicle. Currently, the sticker is usually made of paper, and can not be reused. One sticker has to be made for each vehicle every year, and with increasing number of vehicles, hundreds of millions of pieces of paper are wasted annually. Moreover, the paper sticker is inconvenient to check, and it is unable to acquire previous annual inspection information of the vehicle from the sticker, which is neither convenient to use nor environment-friendly.

In a technical solution in related technologies, vehicle inspection information is generally displayed by adopting an electronic tag, however, remote updating of the electronic tag can not be achieved in the technical solution, and vehicle owner has to go to vehicle administration office regularly for the updating, which is very inconvenient; moreover, the electronic tag has to be powered (by battery or vehicle-mounted power source) all the time during its usage, which leads to tremendous waste of electric power and high cost.

SUMMARY

Embodiments of the present disclosure provide an electronic tag system, including: a communication device, configured to receive updated annual inspection information; a display device, configured to display the updated annual inspection information; and a power control device, connected to the communication device and the display device respectively and configured to: connect, when the communication device receives the updated annual inspection information, a power source to the display device electrically to power the display device, so as to perform updating of annual inspection information on the display device; and disconnect the power source from the display device when the updating is finished.

In some embodiments of the present disclosure, the power control device includes a wake-up circuit, a control circuit and a switch circuit, where the control circuit is connected to the wake-up circuit, the power source and the switch circuit respectively, the switch circuit is connected to the communication device and the display device respectively; the wake-up circuit is configured to wake the control circuit to switch from a sleep mode to an operating mode; and the control circuit is configured to control, in the operating mode, the switch circuit to be turned on when it is detected that the communication device has received the annual inspection information, and control the switch circuit to be turned off and switch from the operating mode to the sleep mode when the updating is finished.

In some embodiments of the present disclosure, the switch circuit includes a MOS switch or an electronic analog switch.

In some embodiments of the present disclosure, the wake-up circuit includes a touch switch, and the touch switch is configured to send, when a touch signal is received, a wake-up signal to the control circuit to wake the control circuit to switch from the sleep mode to the operating mode.

In some embodiments of the present disclosure, the communication device is configured to receive the updated annual inspection information via a Narrow Band Internet of Things (NB-IOT) network.

In some embodiments of the present disclosure, the display device is an electronic paper screen.

In some embodiments of the present disclosure, the system further includes a storage device, connected to the communication device and the display device respectively and configured to store the updated annual inspection information.

In some embodiments of the present disclosure, the display device is configured to read the updated annual inspection information from the storage device during performing the updating of the annual inspection information.

Further, embodiments of the present disclosure provide a method of updating electronic tag information, including: receiving updated annual inspection information; connecting a power source to a display device electrically, to power the display device so as to perform updating of annual inspection information on the display device, and displaying the updated annual inspection information on the display device when the updating is finished; and disconnecting the power source from the display device.

In some embodiments of the present disclosure, connecting the power source to the display device electrically includes: switching from a sleep mode to an operating mode; connecting the power source to the display device electrically, to power the display device; and disconnecting the power source from the display device includes: disconnecting the power source from the display device and switching from the operating mode to the sleep mode.

In some embodiments of the present disclosure, receiving the updated annual inspection information includes: receiving the updated annual inspection information via an NB-IOT network.

Further, embodiments of the present disclosure provide an electronic tag system, including: a processor, a memory and a program stored on the memory and executable by the processor, wherein when the program is executed by the processor, steps of the method of updating the electronic tag information as described above are performed.

Further, embodiments of the present disclosure provide a computer readable storage medium, storing a program thereon, wherein when the program is executed by a processor, steps of the method of updating the electronic tag information as described above are performed.

DETAILED DESCRIPTION

In order to clarify objectives, features and advantages of the present disclosure, detailed descriptions are provided in conjunction with the drawings and embodiments hereinafter.

To address the problem in the related technologies that the vehicle-mounted electronic tag is inconvenient to use and has high cost, embodiments of the present disclosure provide an electronic tag system and a method of updating electronic tag information.

Figure 1:
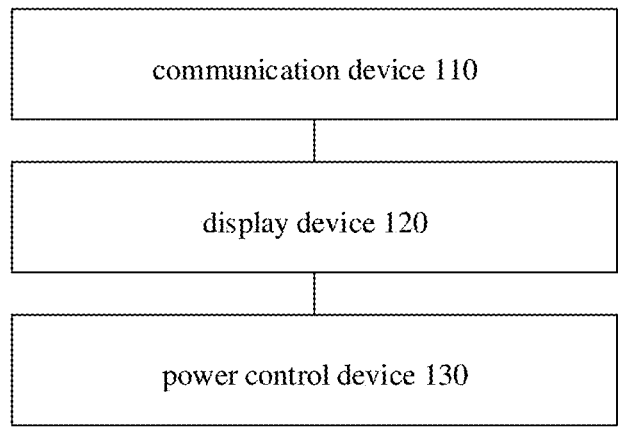
FIG. 1 illustrates a schematic structural diagram of an electronic tag system provided by embodiments of the present disclosure.

Referring to FIG. 1, a schematic structural diagram of an electronic tag system provided by embodiments of the present disclosure is illustrated. The electronic tag system may include: a communication device 110, a display device 120 and a power control device 130.

The communication device 110 is configured to receive updated annual inspection information.

The display device 120 is configured to display the updated annual inspection information.

The power control device 130 is connected to the communication device and the display device respectively and is configured to: connect, when the communication device receives the updated annual inspection information, a power source to the display device electrically to power the display device, so as to perform updating of annual inspection information on the display device; and disconnect the power source from the display device when the updating is finished.

The communication device 110 may be, for example, a communication chip.

In embodiments of the present disclosure, the electronic tag system may be applied to a vehicle-mounted system, e.g., in a family car, a large truck or the like, which is not limited by the embodiments of the present disclosure.

After vehicle inspections for each vehicle are completed, the administration system of the vehicle administration office may store the vehicle inspection information (i.e., annual inspection information) of the vehicles in a database of the administration system, as shown in the following table 1.

TABLE 1

| Owner name | Telephone number | License plate | Insurance | Date of vehicle inspection |
|---|---|---|---|---|
| Zhang San | 13512345678 | A123456 | 00011345 | 2017 Dec. 31 |
| Li Si | 13812345648 | C123456 | 00011346 | 2017 Jun. 31 |
| Wang Wu | 13356435874 | B123456 | 00011348 | 2017 Nov. 31 |
| Zhao Liu | 15132654845 | Q123456 | 00011342 | 2017 Dec. 25 |

After all inspections are performed and passed, the administration system of the vehicle administration office may transmit the vehicle inspection information of each vehicle to the corresponding vehicle via an NB-IOT network, for example, vehicle identification of each vehicle may be stored in the administration system and the vehicle inspection information of each vehicle is transmitted to a designated vehicle based on the vehicle identification.

In practical applications, transmitting the vehicle inspection information of the each vehicle to the designated vehicle may be implemented with related technologies in the art, which is not described in detail in the embodiments of the present disclosure.

The electronic tag system according to the embodiments of the present disclosure is provided with the communication device 110 configured to receive the updated annual inspection information.

A terminal of the power control device 130 provided by the embodiments of the present disclosure is connected to the power source, and another terminal of the power control device 130 is connected to the communication device 110 and the display device 120 respectively. When the annual inspection information of a vehicle is to be updated, the power control device 130 may connect the power source to the display device 120 electrically to power the display device 120, so as to meet of the need of the updating of the annual inspection information on the display device 120.

In embodiments of the present disclosure, the power source may be a vehicle-mounted battery of a vehicle-mounted equipment, to power the display device 120. Other means may be employed to power the display device 120, which is not limited by embodiments of the present disclosure.

Figure 2:
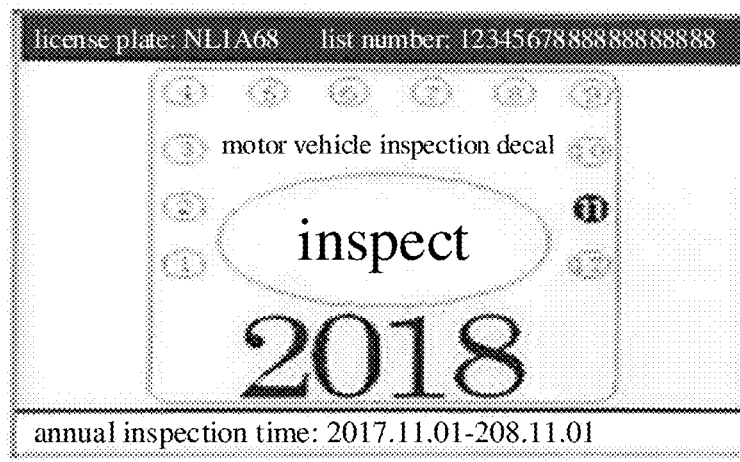
FIG. 2 illustrates a schematic diagram of an electronic paper screen displaying annual inspection information provided by embodiments of the present disclosure.

After the updating is finished, the updated annual inspection information may be displayed on the display device 120. In embodiments of the present disclosure, the display device 120 may be an electronic paper screen. For example, referring to FIG. 2, a schematic diagram of an electronic paper screen displaying the annual inspection information provided by embodiments of the present disclosure is illustrated. As shown in FIG. 2, the latest annual inspection information of the vehicle, such as license plate number information and insurance information, is displayed on the electronic paper screen.

In an optional embodiment of the present disclosure, the electronic paper screen has low power consumption. In specific, referring to FIG. 3, a schematic diagram of an electronic paper screen provided by embodiments of the present disclosure is illustrated.

Figure 3:
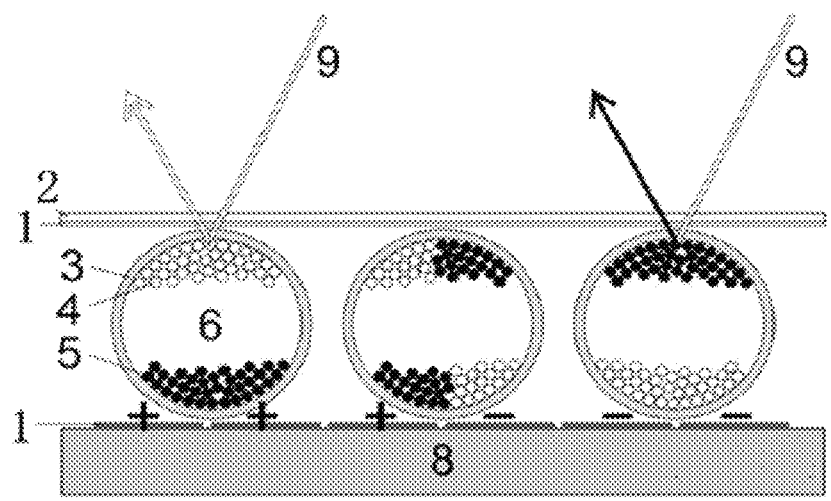
FIG. 3 illustrates a schematic diagram of an electronic paper screen provided by embodiments of the present disclosure.

The reference numbers as shown in FIG. 3 have meanings as follows: 1—surface layer, 2—transparent electrode, 3—capsule, 4—positively charged white pigment, 5—negatively charged black pigment, 6—transparent dispersion medium, 7—bottom electrode, 8—support layer, 9—external light.

As shown in FIG. 3, pixel point corresponding to the left external light 9 displays white color, and pixel point corresponding to the right external light 9 displays black color.

Each capsule 3 has a fluid with electric charges, where positive charges are white colored, and negative charges are black colored. When a positive/negative voltage is applied on a location at a side, the electric charges in the fluid are attracted or repelled correspondingly, so that each pixel point displays white color or black color.

Further, since refreshment of the electronic ink is not continuous and the electronic ink exhibits a bi-stable behavior (hysteresis), the state as shown in FIG. 3 may be maintained after each refreshment. Therefore, the electronic ink device is good at saving power, as the power consumed by the screen of the electronic paper screen is zero if no change to the display content is required.

When the updating of the annual inspection information of the vehicle is over, the power control device 130 may disconnect the power source from the display device 120 for power saving.

Figure 4:
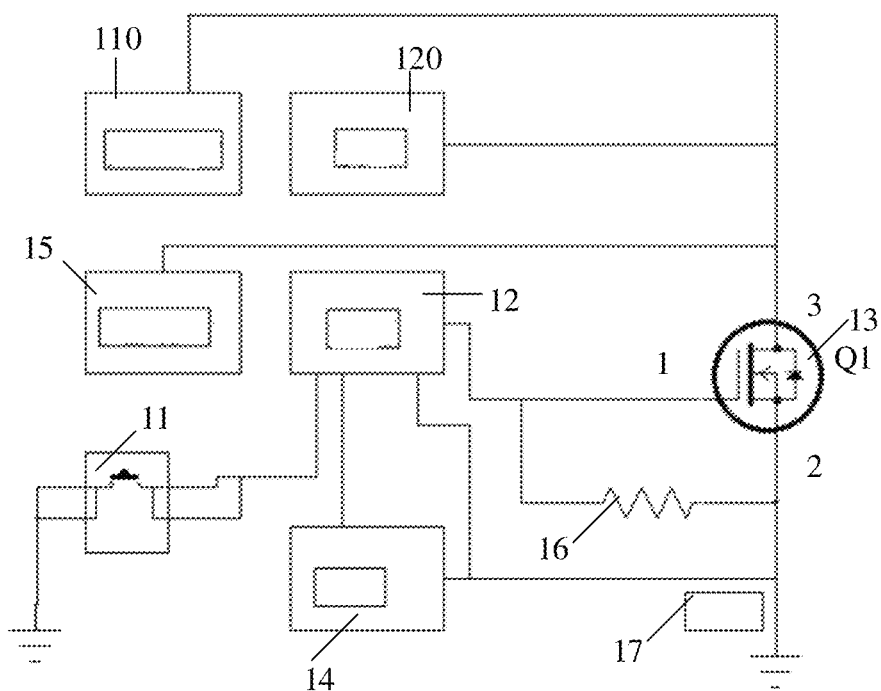
FIG. 4 illustrates a schematic diagram of a connection relationship of a power control device provided by embodiments of the present disclosure.

Referring to FIG. 4, a schematic diagram of a connection relationship of a power control device provided by embodiments of the present disclosure is illustrated. As shown in FIG. 4, the power control device 130 may include: a wake-up circuit 11, a control circuit 12 and a switch circuit 13, where the control circuit 12 may be connected to the wake-up circuit 11, the power source 14 and the switch circuit 13 respectively, and the switch circuit 13 may be connected to the communication device 110 and the display device 120 respectively.

When the annual inspection information is to be updated, the wake-up circuit 11 may be configured to wake the control circuit 12 to switch from a sleep mode to an operating mode, where in the operating mode, the control circuit 12 controls the switch circuit 13 to be turned on when it is detected that the communication device 110 has received the annual inspection information, and controls the switch circuit 13 to be turned off and switches from the operating mode of the control circuit 12 to the sleep mode when the updating is finished.

In specific, as shown in the drawing, the wake-up circuit 11 may be a provided switch, the control circuit 12 may be a CPU, and the switch circuit 13 may be a MOS switch or an electronic analog switch etc. A detailed description of the circuit diagram illustrated in FIG. 4 is provided hereinafter.

In normal operation state, the CPU is in an operating mode, a pin of the CPU that is connected to a terminal 1 of a NMOS switch is at a high level, thus the NMOS switch is turned on, and the MOS switch is conductive between its terminals 2 and 3. In embodiments of the present disclosure, a NMOS switch with very low on-resistance is employed, and GND 17 of other modules of the circuit board is connected directly to ground, thereby the system is in the normal operation state.

When the system needs to enter a low power mode, the CPU may make the pin which is connected to the terminal 1 of the NMOS switch to be at a low level, as a result, the NMOS switch is cutoff between its terminals 2 and 3, devices such as the communication device 110, a cache 15 and the display device 120 are disconnected from ground, which may be equivalent to being disconnected from the power source completely, and then the CPU enters the low power mode, rendering a very low power consumption of the entire system.

In embodiments of the present disclosure, the cache 15 may cache the updated vehicle inspection information as received, such that when the display device 120 is performing updating of the vehicle inspection information, the display device 120 may read the information directly from the cache 15. It can be understood that, the cache 15 may be a flash cache or other types of caches, which is not limited by embodiments of the present disclosure.

If the entire system is to be woken, the CPU may be woken by pressing a switch button, and then the CPU controls the NMOS switch to make the system to enter the operation state.

Further, a resistor 16 is connected in parallel between the CPU and the NMOS switch, so as to prevent electrostatic interference and prevent electrostatic breakdown of the NMOS switch during operation.

In another optional embodiment of the present disclosure, the wake-up circuit 11 may include a touch switch, and the touch switch may be configured to send, when a touch signal is received, a wake-up signal to the control circuit 12 to wake the control circuit 12 to switch from the sleep mode to the operating mode.

According to the electronic tag system provided by the embodiments of the present disclosure, the updated annual inspection information is received remotely; in updating the annual inspection information, the power source is connected electrically to the display device so as to power the display device, and the updated annual inspection information is displayed on the display device; and when the updating is over, the power source is disconnected from the display device. In comparison with the technical solution in the related technologies, the solution according to the embodiments of the present disclosure can achieve remote updating of the vehicle-mounted electronic tag, and since the power source may be disconnected from the display device when the updating is over, significant amount of electric power is saved and usage cost is reduced.

Figure 5:
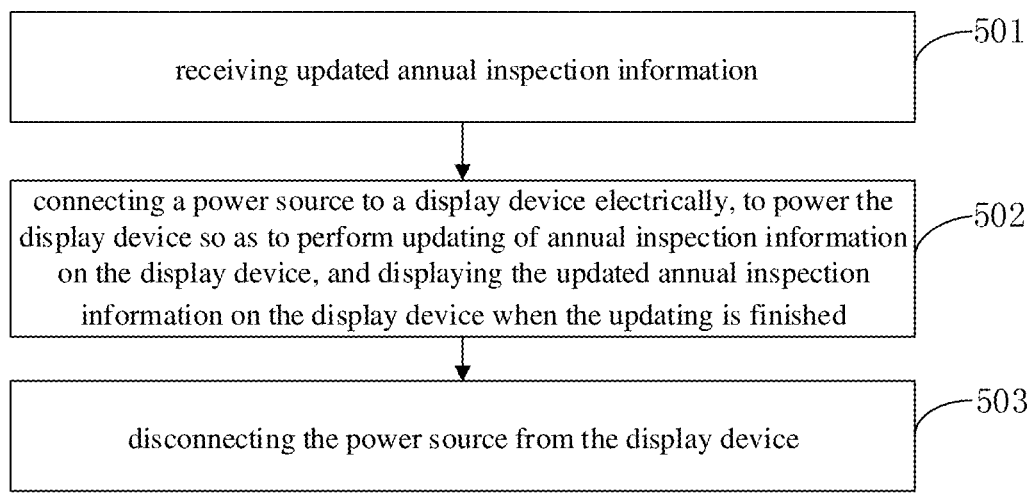
FIG. 5 illustrates a flow chart of a method of updating electronic tag information provided by embodiments of the present disclosure.

Referring to FIG. 5, a flow chart of a method of updating electronic tag information provided by embodiments of the present disclosure is illustrated. The method may include steps 501 to 503.

Step 501: receiving updated annual inspection information.

In embodiments of the present disclosure, after vehicle inspections for each vehicle are completed, the administration system of the vehicle administration office may store the vehicle inspection information of the vehicles in a database of the administration system. After all inspections are performed and passed, the administration system of the vehicle administration office may transmit the vehicle inspection information of each vehicle to the corresponding vehicle via an NB-IOT network. Specifically, vehicle identification of each vehicle may be stored in the administration system and the vehicle inspection information of each vehicle is transmitted to a designated vehicle based on the vehicle identification.

After the updated annual inspection information is received, the process proceeds to step 502.

Step 502: connecting a power source to a display device electrically, to power the display device so as to perform updating of annual inspection information on the display device, and displaying the updated annual inspection information on the display device when the updating is finished.

After the updated annual inspection information is received, an operation of updating the annual inspection information on the display device is performed. For purpose of power saving, the power source is disconnected from the display device prior to the updating operation. When the annual inspection information on the display device is to be updated after the updated annual inspection information is received, it is needed to connect the power source to the display device electrically, so that the display device is powered by the power source to complete the updating of annual inspection information on the display device. After the updating is finished, the updated annual inspection information is displayed on the display device.

In an optional embodiment of the present disclosure, the step 502 may include the following sub-steps.

Sub-step N1: switching from a sleep mode to an operating mode.

Sub-step N2: connecting the power source to the display device electrically, to power the display device.

In embodiments of the present disclosure, when the updating of the annual inspection information is required, the CPU is switched from the sleep mode to the operating mode; then, the power source is connected electrically to the display device to power the display device, and the updating of the annual inspection information on the display device is controlled by the CPU.

Step 503: disconnecting the power source from the display device.

After the updating is finished, the power source is disconnected from the display device, and the CPU is switched from the operating mode to the sleep mode, so that power may be saved when the updating of the annual inspection information on the display device is not required.

According to the method of updating electronic tag information provided by the embodiments of the present disclosure, the updated annual inspection information is received remotely; in updating the annual inspection information, the power source is connected electrically to the display device so as to power the display device, and the updated annual inspection information is displayed on the display device; and when the updating is over, the power source is disconnected from the display device. In comparison with the technical solution in the related technologies, the solution according to the embodiments of the present disclosure can achieve remote updating of the vehicle-mounted electronic tag, and since the power source may be disconnected from the display device when the updating is over, significant amount of electric power is saved and usage cost is reduced.

Embodiments of the present disclosure further provide an electronic tag system, including a receiver, a processor, a memory and a program stored on the memory and executable by the processor, where when the program is executed by the processor, the following steps are performed: receiving updated annual inspection information; connecting a power source to a display device electrically, to power the display device so as to perform updating of annual inspection information on the display device, and displaying the updated annual inspection information on the display device when the updating is finished; and disconnecting the power source from the display device.

In some embodiments of the present disclosure, connecting the power source to the display device electrically includes: switching from a sleep mode to an operating mode; connecting the power source to the display device electrically, to power the display device; and disconnecting the power source from the display device includes: disconnecting the power source from the display device and switching from the operating mode to the sleep mode.

In some embodiments of the present disclosure, receiving the updated annual inspection information includes: receiving the updated annual inspection information via an NB-IOT network.

Embodiments of the present disclosure further provide a computer readable storage medium storing a program thereon, where when the program is executed by a processor, processes of the embodiments of the method of updating the electronic tag information described above are performed.

While, for purposes of simplicity of explanation, the method embodiments are described as a series of actions, it is to be appreciated by those skilled in the art that the present disclosure is not limited by the described order of the actions, as some steps may, in accordance with the present disclosure, occur in different orders or concurrently. Moreover, it is to be appreciated by those skilled in the art that the embodiments described in the specification are optional, and not all illustrated actions and modules are necessary for the present disclosure.

The various embodiments in the specification are described in a progressive manner, differences from other embodiments are emphatically illustrated in each embodiment, and reference can be made to each other for understanding the same or similar sections.

Finally, it should also be noted that in the present disclosure, relational terms such as "first" and "second" are merely used to distinguish one entity or operation from another entity or operation, rather than require or indicate any actual relationship or order between the entities or operations. Furthermore, the terms "include" or "have" or any other variants thereof are intended to cover non-exclusive inclusion, so that a process, method, article or apparatus including a series of elements is not limited to those elements, and optionally includes other elements that are not specifically listed or that are inherent in the process, method, article or apparatus. With no other limitations, an element restricted by the phrase "include a . . . " does not exclude the existence of other identical elements in the process, method, article or apparatus including the element.

An electronic tag system and a method of updating electronic tag information provided by the present disclosure are described above in detail. The principles and implementations of the present disclosure are described in conjunction with the specific examples, and the description of the above embodiments is only made to help understand the method of the present disclosure and its core ideas. Besides, changes to particular implementations and application ranges can be made by those skilled in the art based on the ideas of the present disclosure. Therefore, the specification shall not be interpreted as limitation to the present disclosure.

What is claimed is:
1. An electronic tag system, comprising:
 a communication device, configured to receive updated annual inspection information;
 a display device, configured to display the updated annual inspection information; and
 a power control device, connected to the communication device and the display device respectively, and configured to:
  connect, when the communication device receives the updated annual inspection information, a power source to the display device electrically to power the display device, so as to perform updating of annual inspection information on the display device; and
  disconnect the power source from the display device when the updating is finished;
 wherein the power control device comprises a wake-up circuit, a control circuit and a switch circuit;
 wherein the control circuit is connected to the wake-up circuit, the power source and the switch circuit respectively, and the switch circuit is connected to the communication device and the display device respectively;
 wherein the wake-up circuit is configured to wake the control circuit to switch from a sleep mode to an operating mode;
 wherein the control circuit is configured to control, in the operating mode, the switch circuit to be turned on when it is detected that the communication device has received the annual inspection information, and control the switch circuit to be turned off and switch from the operating mode to the sleep mode when updating is finished; and
 wherein the wake-up circuit comprises a touch switch, and the touch switch is configured to send, when a touch signal is received, a wake-up signal to the control circuit to wake the control circuit to switch from the sleep mode to the operating mode.

2. The electronic tag system according to claim 1, wherein the switch circuit comprises a MOS switch or an electronic analog switch.

3. The electronic tag system according to claim 1, wherein the communication device is configured to receive the updated annual inspection information via a Narrow Band Internet of Things (NB-IOT) network.

4. The electronic tag system according to claim 1, wherein the display device is an electronic paper screen.

5. The electronic tag system according to claim 1, further comprising a storage device, connected to the communication device and the display device respectively and configured to store the updated annual inspection information.

6. The electronic tag system according to claim 5, wherein the display device is configured to read the updated annual inspection information from the storage device during performing the updating of the annual inspection information.

7. A method of updating electronic tag information, comprising:
   receiving updated annual inspection information;
   connecting a power source to a display device electrically, to power the display device so as to perform updating of annual inspection information on the display device, and displaying the updated annual inspection information on the display device when the updating is finished; and
   disconnecting the power source from the display device;
   wherein connecting the power source to the display device electrically comprises:
      switching from a sleep mode to an operating mode; and connecting the power source to the display device electrically, to power the display device;
   wherein disconnecting the power source from the display device comprises:
      disconnecting the power source from the display device and switching from the operating mode to the sleep mode; and
   wherein switching from the sleep mode to the operating mode comprises switching from the sleep mode to the operating mode in response to a wake-up signal, and the wake-up signal is sent when a touch signal is received.

8. The method according to claim 7, wherein receiving the updated annual inspection information comprises:
   receiving the updated annual inspection information via a Narrow Band Internet of Things (NB-IOT) network.

9. An electronic tag system, comprising: a processor, a memory and a program stored on the memory and executable by the processor, wherein when the program is executed by the processor, the following steps are performed:
   receiving updated annual inspection information;
   connecting a power source to a display device electrically, to power the display device so as to perform updating of annual inspection information on the display device, and displaying the updated annual inspection information on the display device when the updating is finished; and
   disconnecting the power source from the display device;
   wherein connecting the power source to the display device electrically comprises:
      switching from a sleep mode to an operating mode; and connecting the power source to the display device electrically, to power the display device;
   wherein disconnecting the power source from the display device comprises:
      disconnecting the power source from the display device and switching from the operating mode to the sleep mode; and
   wherein switching from the sleep mode to the operating mode comprises switching from the sleep mode to the operating mode in response to a wake-up signal, and the wake-up signal is sent when a touch signal is received.

10. A non-transitory computer readable storage medium, storing a program thereon, wherein when the program is executed by a processor, steps of the method of updating the electronic tag information according to claim 7 are performed.

11. The electronic tag system according to claim 2, further comprising a storage device, connected to the communication device and the display device respectively and configured to store the updated annual inspection information.

12. The electronic tag system according to claim 11, wherein the display device is configured to read the updated annual inspection information from the storage device during performing the updating of the annual inspection information.

13. The electronic tag system according to claim 3, further comprising a storage device, connected to the communication device and the display device respectively and configured to store the updated annual inspection information.

14. The electronic tag system according to claim 13, wherein the display device is configured to read the updated annual inspection information from the storage device during performing the updating of the annual inspection information.

15. The electronic tag system according to claim 4, further comprising a storage device, connected to the communication device and the display device respectively and configured to store the updated annual inspection information.

16. The electronic tag system according to claim 15, wherein the display device is configured to read the updated annual inspection information from the storage device during performing the updating of the annual inspection information.

* * * * *